United States Patent
Coffman

(10) Patent No.: US 7,036,831 B2
(45) Date of Patent: May 2, 2006

(54) SHOPPING CART MOUNTED CHILD RESTRAINT APPARATUS

(76) Inventor: Paul V. Coffman, 170 Crystal Rd., Boiling Spring Lakes, NC (US) 28461

( * ) Notice: Subject to any disclaimer, the term of this patent is extended or adjusted under 35 U.S.C. 154(b) by 104 days.

(21) Appl. No.: 10/639,725

(22) Filed: Aug. 12, 2003

(65) Prior Publication Data

US 2004/0041457 A1    Mar. 4, 2004

Related U.S. Application Data

(60) Provisional application No. 60/406,647, filed on Aug. 28, 2002.

(51) Int. Cl.
*B60R 22/00* (2006.01)
(52) U.S. Cl. .............. 280/33.993; 280/801.1; 280/DIG. 4
(58) Field of Classification Search ............. 280/801.1, 280/33.992, 33.993, DIG. 4; 297/254, 255, 297/229, 256.17, 474, 475, 478, 485, 468, 297/486, 487
See application file for complete search history.

(56) References Cited

U.S. PATENT DOCUMENTS

| | | | |
|---|---|---|---|
| 3,306,661 A * | 2/1967 | Allen | 297/474 |
| 3,350,136 A * | 10/1967 | Allen | 297/476 |
| 4,621,589 A * | 11/1986 | Thinnes | 119/770 |
| 4,655,502 A | 4/1987 | Houllis | |
| 5,271,634 A * | 12/1993 | Walton | 280/33.992 |
| 5,439,253 A * | 8/1995 | Trubiano | 280/801.1 |
| 5,641,200 A * | 6/1997 | Howell | 297/256.17 |
| 5,715,571 A | 2/1998 | Fasano | |
| 5,967,607 A | 10/1999 | Waldroup | |
| 6,065,764 A * | 5/2000 | Moseley | 280/33.992 |
| 6,142,544 A * | 11/2000 | Benzoni et al. | 294/19.2 |
| 6,206,471 B1 | 3/2001 | McGowan | |
| 6,237,998 B1 | 5/2001 | Aprile | |
| 6,832,813 B1 * | 12/2004 | Tomas et al. | 297/250.1 |

* cited by examiner

*Primary Examiner*—Christopher P. Ellis
*Assistant Examiner*—Bridget Avery

(57) ABSTRACT

A shopping cart mounted child restraint apparatus includes a cylindrical housing which includes first and second housing ends and strap passageway channels. An extendible and retractable safety restraint strap assembly is housed within the cylindrical housing. Distal portions of straps pass through the strap passageway channels. First and second housing-to-shopping-cart connectors are connected to the first and second housing ends, respectively. First and second strap passageway housing channels are located at the first and second housing ends, respectively. The child restraint apparatus of the invention is mounted on a shopping cart in place of a conventional shopping cart handle. To restrain a child in a shopping cart seat, straps are pulled out from the cylindrical housing, wrapped around the child, and secured to each other. When the child no longer needs to be restrained, the straps are disengaged from each other and contract back into the cylindrical housing.

15 Claims, 3 Drawing Sheets

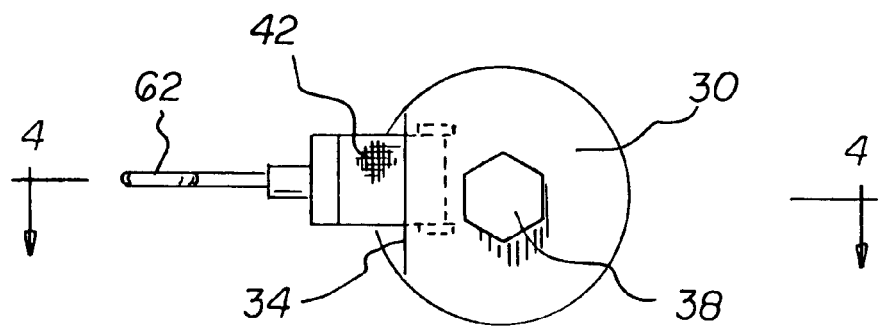
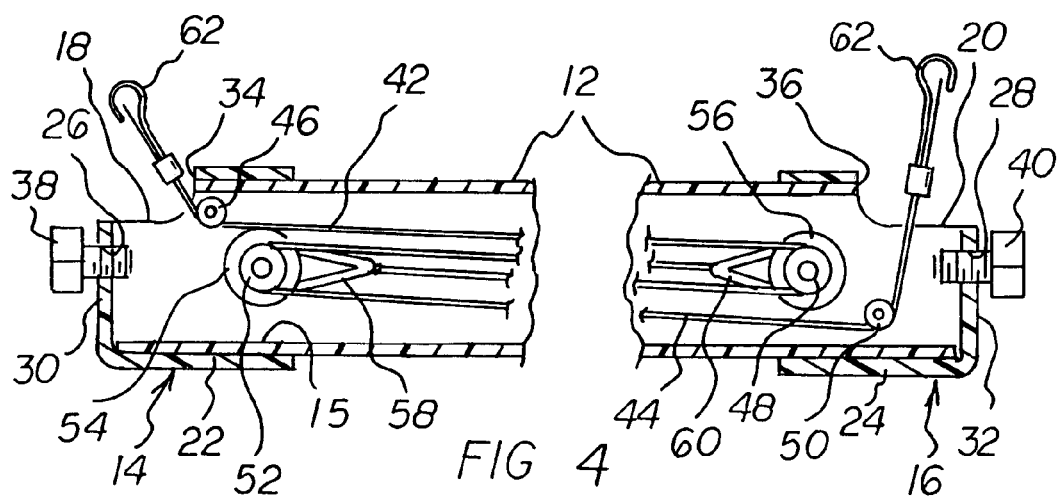

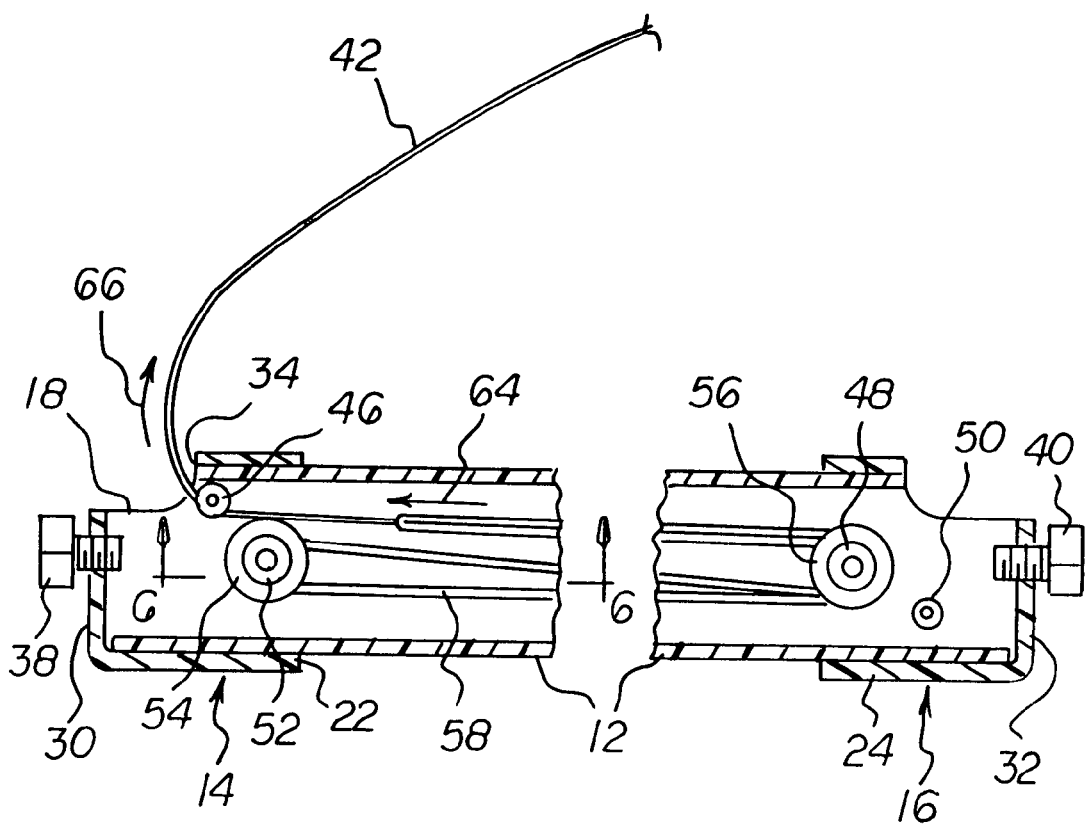
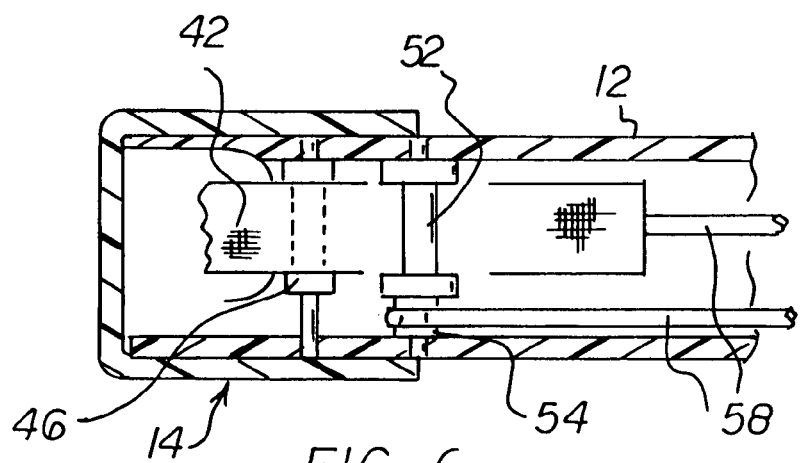

SHOPPING CART MOUNTED CHILD RESTRAINT APPARATUS

CROSS-REFERENCE TO RELATED APPLICATION

This application claims priority based upon my copending Provisional Application Ser. No. 60/406,647; filed Aug. 28, 2002.

BACKGROUND OF THE INVENTION

1. Field of the Invention

The present invention relates generally to child restraint devices and, more particularly, to child restraint devices especially adapted for use on shopping carts.

2. Description of the Prior Art

It is well known for patrons of supermarkets and the like to use shopping carts. Many shopping carts are equipped with seats for children. For added safety of a child sitting in a shopping cart seat, a child restraint device is often provided. Generally, such child restraint devices include straps for securing the child to the shopping cart seat.

Throughout the years, a number of innovations have been developed relating to restraining children in shopping cart seats, and the following U.S. patents are representative of some of those innovations: U.S. Pat. Nos. 4,655,502, 5,967,607, and 6,206,471. Each of U.S. Pat. Nos. 4,655,502, 5,967,607, and 6,206,471 discloses flaccid safety straps that are used as seat belts for shopping carts equipped with seats for children. The respective seat belts hang freely when not in use. As a result, such seat belts can become twisted and tangled. Consequently, when it the seat belts are needed, they may not be readily available. Often, if a supermarket patron has a small child, it is very difficult for the patron to untangle the seat belt and hold the child at the same time. In this respect, it would be desirable if seat belts for shopping cart seats would be provided, wherein the seat belts do not get twisted or tangled when not in use.

Still other features would be desirable in a shopping cart mounted child restraint apparatus. In this respect, it is noted that the handle of a shopping cart generally serves a single function, that of being grasped by a user for controlling motion of the shopping cart. To make better use of a shopping cart handle, it would be desirable if the handle of a shopping cart could also serve an additional function of storing seat belts that are not in use so they do not get twisted and tangled.

When seat belts for a shopping cart are not being used, it would be desirable if the unused seat belts were automatically placed in a stored condition so that they are automatically prevented from being twisted or tangled.

Generally, conventional shopping carts do not have provision for seat belt storage. In this respect, it would be desirable if a device were provided that enables a handle of a shopping cart to serve as a storage device for seat belts when the seat belts are not in use.

Moreover, since conventional shopping carts do not have provision for seat belt storage, it would be desirable to provide a device which enables a conventional shopping cart to be retrofitted for a handle that includes seat belt storage.

U.S. Pat. No. 5,715,571 may be of interest for its disclosure of a shopping cart handle cover. U.S. Pat. No. 6,237,998 may be of interest for its disclosure of a baby seat cover.

Thus, while the foregoing body of prior art indicates it to be well known to use seat belts on shopping carts, the prior art described above does not teach or suggest a shopping cart mounted child restraint apparatus which has the following combination of desirable features: (1) prevents the seat belts from becoming twisted or tangled when not in use; (2) provides a handle of a shopping cart that also serves an additional function of storing seat belts that are not in use so they do not get twisted and tangled; (3) provides for unused seat belts to be automatically placed in a stored condition so that they are automatically prevented from being twisted or tangled; (4) enables a handle of a shopping cart to serve as a storage device for seat belts when the seat belts are not in use; and (5) enables a conventional shopping cart to be retrofitted for a handle that includes seat belt storage. The foregoing desired characteristics are provided by the unique shopping cart mounted child restraint apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a shopping cart mounted child restraint apparatus which includes a cylindrical housing which includes first housing end, a second housing end, and strap passageway channel means. An extendible and retractable safety restraint strap assembly is housed within the cylindrical housing, wherein distal portions of straps of the safety restraint strap assembly pass through the strap passageway channel means. First housing-to-shopping-cart connector means are connected to the first housing end, and second housing-to-shopping-cart connector means are connected to the second housing end. The strap passageway channel means include a first strap passageway housing channel located at the first housing end, and a second strap passageway housing channel is located at the second housing end. The child restraint apparatus of the invention is mounted on a shopping cart in place of a conventional shopping cart handle. When a child is to be restrained in the shopping cart seat, straps of the safety restraint strap assembly are pulled out from the cylindrical housing, wrapped around the child, and secured to each other. When the safety restraint strap assembly is no longer need, the straps are disengaged from each other and contract back into the cylindrical housing.

The first housing-to-shopping-cart connector means can include a first housing end reception cap, and the second housing-to-shopping-cart connector means can include a second housing end reception cap. The first housing end reception cap includes a first housing end reception sleeve portion and a first cap end portion connected to the first housing end reception sleeve portion. The first housing end reception sleeve portion receives the first housing end, and the first cap end portion includes a first fastener reception channel.

The second housing end reception cap includes a second housing end reception sleeve portion and a second cap end portion connected to the second housing end reception sleeve portion. The second housing end reception sleeve portion receives the second housing end, and the second cap end portion includes a second fastener reception channel.

The first housing-to-shopping-cart connector means further include a first fastener received in the first fastener reception channel, and the second housing-to-shopping-cart connector means further include a second fastener received in the second fastener reception channel.

The strap passageway channel means further include a first cap strap passageway in the first housing end reception sleeve portion and a second cap strap passageway in the second housing end reception sleeve portion. The first cap strap passageway is in registration with the first strap passageway housing channel, and the second cap strap passageway is in registration with the second strap passageway housing channel.

The safety restraint strap assembly includes a strap/guide assembly, and housing-to-strap/guide-assembly connector means are connected to the strap/guide assembly for connecting the strap/guide assembly to the cylindrical housing.

Preferably, the strap/guide assembly includes a first strap. A first exit guide roller is connected to the cylindrical housing. A first direction reversal roller is connected to the cylindrical housing. A second strap is provided, and a second exit guide roller is connected to the cylindrical housing. A second direction reversal roller is connected to the cylindrical housing.

Preferably, the housing-to-strap/guide-assembly connector means include a first housing-to-strap connector connected between the cylindrical housing and the first strap and also include a second housing-to-strap connector connected between the cylindrical housing and the second strap.

The housing-to-strap/guide-assembly connector means further include a first spring unit connected between the first housing-to-strap connector and the first strap and also include a second spring unit connected between the second housing-to-strap connector and the second strap. The first spring unit and the second spring unit can include bungee cords. In addition, the first strap and the second strap can be elastic. Each of the first strap and the second strap further includes clasps attached to respective free ends of the respective straps.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shopping cart mounted child restraint apparatus which has all of the advantages of the prior art and none of the disadvantages.

It is another object of the present invention to provide a new and improved shopping cart mounted child restraint apparatus which may be easily and efficiently manufactured and marketed.

It is a further object of the present invention to provide a new and improved shopping cart mounted child restraint apparatus which is of durable and reliable construction.

An even further object of the present invention is to provide a new and improved shopping cart mounted child restraint apparatus which is susceptible of a low cost of manufacture with regard to both materials and labor, and which accordingly is then susceptible of low prices of sale to the consuming public, thereby making such shopping cart mounted child restraint apparatus available to the buying public.

Still yet a further object of the present invention is to provide a new and improved shopping cart mounted child restraint apparatus which prevents the seat belts from becoming twisted or tangled when not in use.

Still another object of the present invention is to provide a new and improved shopping cart mounted child restraint apparatus that provides a handle of a shopping cart that also serves an additional function of storing seat belts that are not in use so they do not get twisted and tangled.

Yet another object of the present invention is to provide a new and improved shopping cart mounted child restraint apparatus which provides for unused seat belts to be automatically placed in a stored condition so that they are automatically prevented from being twisted or tangled.

Even another object of the present invention is to provide a new and improved shopping cart mounted child restraint apparatus that enables a handle of a shopping cart to serve as a storage device for seat belts when the seat belts are not in use.

Still a further object of the present invention is to provide a new and improved shopping cart mounted child restraint apparatus which enables a conventional shopping cart to be retrofitted for a handle that includes seat belt storage.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged side view of the embodiment of the shopping cart mounted child restraint apparatus of FIG. 2 taken along line 3—3 thereof.

FIG. 4 is a cross-sectional view of the embodiment of the invention shown in FIG. 3 taken along line 4—4 thereof.

FIG. 5 is a cross-sectional view of the embodiment of the invention in FIG. 4, wherein one of the restraint straps is in an extended condition.

FIG. 6 is an internal bottom view of the portion of the embodiment of the invention shown in FIG. 5, taken along line 6—6 thereof.

DESCRIPTION OF THE PREFERRED EMBODIMENT

Figure 1:
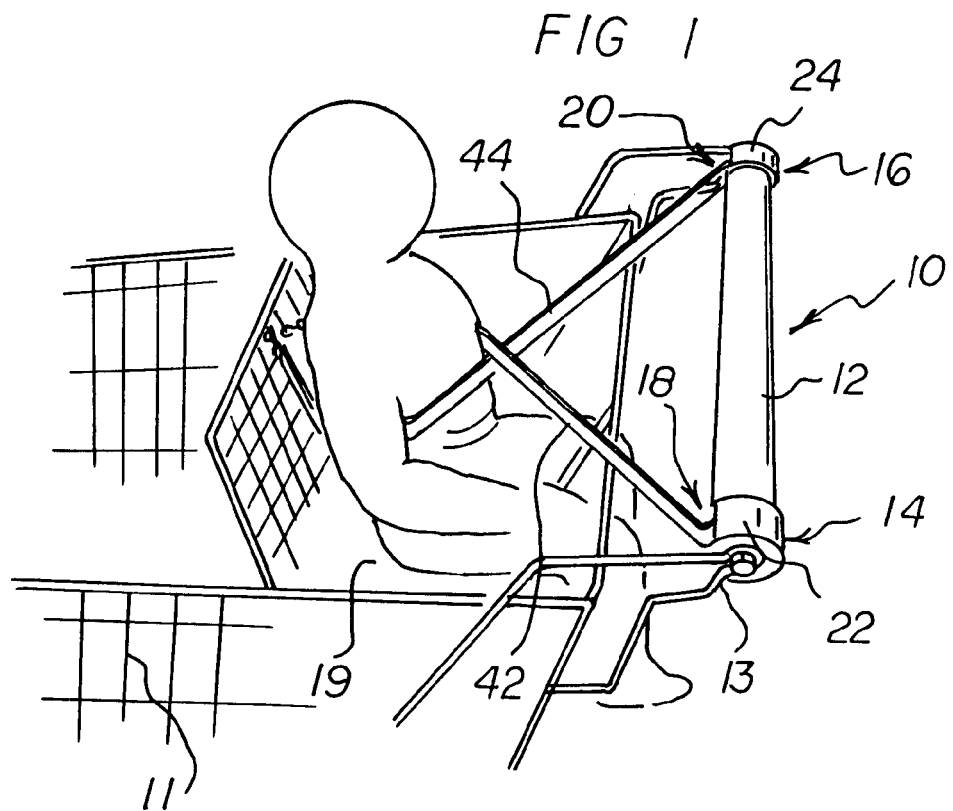
FIG. 1 is a top perspective view showing a preferred embodiment of the shopping cart mounted child restraint apparatus of the invention, in use for restraining a child on a shopping cart.

With reference to the drawings, a new and improved shopping cart mounted child restraint apparatus embodying the principles and concepts of the present invention will be described.

With reference to the drawings, a new and improved shopping cart mounted child restraint apparatus embodying the principles and concepts of the present invention will be described.

Turning to FIGS. 1–6, there is shown a preferred embodiment of the shopping cart mounted child restraint apparatus of the invention generally designated by reference numeral 10. In the preferred embodiment, the shopping cart mounted child restraint apparatus 10 includes a cylindrical housing 12 which includes first housing end 15, a second housing end 17, and strap passageway channel means. An extendible and retractable safety restraint strap assembly is housed within the cylindrical housing 12, wherein distal portions of straps of the safety restraint strap assembly pass through the strap passageway channel means. First housing-to-shopping-cart connector means are connected to the first housing end 15, and second housing-to-shopping-cart connector means are connected to the second housing end 17. The strap passageway channel means include a first strap passageway housing channel 18 located at the first housing end 14, and a second strap passageway housing channel 20 is located at the second housing end 16.

The first housing-to-shopping-cart connector means can include a first housing end reception cap 14, and the second housing-to-shopping-cart connector means can include a second housing end reception cap 16. The first housing end reception cap 14 includes a first housing end reception sleeve portion 22 and a first cap end portion 30 connected to the first housing end reception sleeve portion 22. The first housing end reception sleeve portion 22 receives the first housing end 15, and the first cap end portion 30 includes a first fastener reception channel 26.

The second housing end reception cap 16 includes a second housing end reception sleeve portion 24 and a second cap end portion 32 connected to the second housing end reception sleeve portion 24. The second housing end reception sleeve portion 24 receives the second housing end 17, and the second cap end portion 32 includes a second fastener reception channel 28.

The first housing-to-shopping-cart connector means further include a first fastener 38 received in the first fastener reception channel 26, and the second housing-to-shopping-cart connector means further include a second fastener 40 received in the second fastener reception channel 28.

The strap passageway channel means further include a first cap strap passageway 34 in the first housing end reception sleeve portion 22 and a second cap strap passageway 36 in the second housing end reception sleeve portion 24. The first cap strap passageway 34 is in registration with the first strap passageway housing channel 18, and the second cap strap passageway 36 is in registration with the second strap passageway housing channel 20.

The safety restraint strap assembly includes a strap/guide assembly, and housing-to-strap/guide-assembly connector means are connected to the strap/guide assembly for connecting the strap/guide assembly to the cylindrical housing 12.

Preferably, the strap/guide assembly includes a first strap 42. A first exit guide roller 46 is connected to the cylindrical housing 12. A first direction reversal roller 48 is connected to the cylindrical housing 12. A second strap 44 is provided, and a second exit guide roller 50 is connected to the cylindrical housing 12. A second direction reversal roller 52 is connected to the cylindrical housing 12.

Preferably, the housing-to-strap/guide-assembly connector means include a first housing-to-strap connector 54 connected between the cylindrical housing 12 and the first strap 42 and also include a second housing-to-strap connector 56 connected between the cylindrical housing 12 and the second strap 44.

The housing-to-strap/guide-assembly connector means further include a first spring unit 58 connected between the first housing-to-strap connector 54 and the first strap 42 and also include a second spring unit 60 connected between the second housing-to-strap connector 56 and the second strap 44. The first spring unit 58 and the second spring unit 60 can include bungee cords 58,60. In addition, the first strap 42 and the second strap 44 can be elastic. Each of the first strap 42 and the second strap 44 further includes clasps 62 attached to respective free ends of the respective straps.

The child restraint apparatus 10 of the invention is mounted on a shopping cart 11 in place of a conventional shopping cart handle. More specifically, the conventional shopping cart handle is removed from the shopping cart 11 leaving two exposed shopping cart handle mounting brackets 13.

To mount the child restraint apparatus 10 on the shopping cart 11, the apparatus is positioned between the shopping cart handle mounting brackets 13 so that the first housing end reception cap 14 is adjacent to one shopping cart handle mounting bracket 13, and the second housing end reception cap 16 is adjacent to the other shopping cart handle mounting bracket 13. Then, the first fastener 38 is screwed into the first fastener reception channel 26, and the second fastener 40 is screwed into the second fastener reception channel 28. When the first fastener 38 and the second fastener 40 are tightened, the child restraint apparatus 10 is securely mounted on the shopping cart 11.

Figure 2:
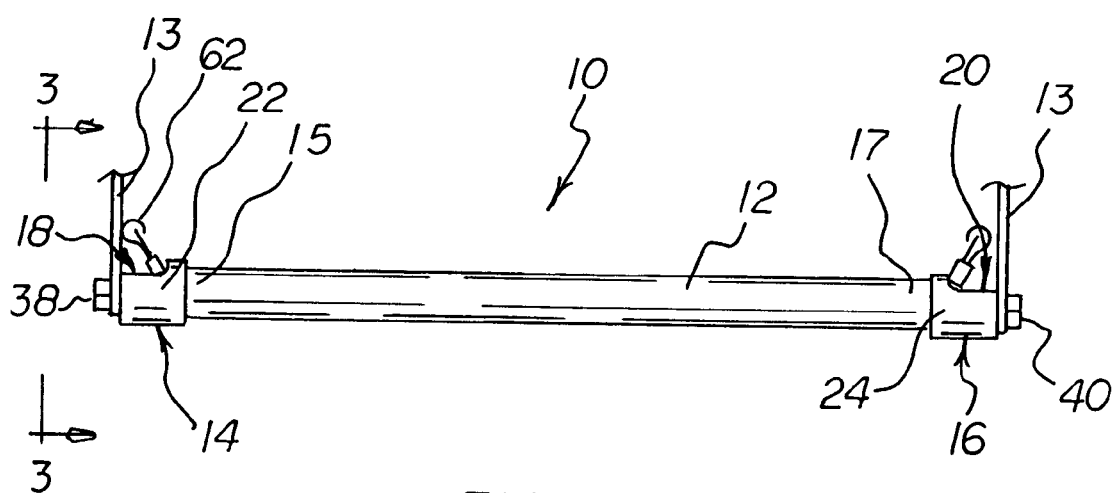
FIG. 2 is a top view of the embodiment of the shopping cart mounted child restraint apparatus shown in FIG. 1, wherein restraint straps are in a retracted condition.

When a child is not seated in the shopping cart seat 19, the strap/guide assembly is fully contracted, such as shown in FIGS. 2, 3, and 4. When a child is seated in the shopping cart seat 19, the first strap 42 and the second strap 44 are pulled out from the cylindrical housing 12, and the two straps are wrapped around the child, as shown in FIG. 1. To secure the two straps together around the child, the two clasps 62 are linked together.

Inside the cylindrical housing 12, the first strap 42 and the second strap 44 operate in substantially the same way. Turning to FIGS. 5 and 6, operation of the first strap 42 is depicted. Operation of the second strap 44 is clearly analogous to the operation of the first strap 42. When the first strap 42 is pulled out from the cylindrical housing 12, the first strap 42 moves in the direction depicted by directional arrow 64 and directional arrow 66 and rides along the first exit guide roller 46 and the first direction reversal roller 48. As the first strap 42 is pulled out from the cylindrical housing 12, the bungee cord 58 is stretched, as shown in FIG. 5. If the bungee cord 58 is stretched far enough, a portion of the bungee cord 58 rides over the first direction reversal roller 48. As stated above, portions of the first strap 42 and the second strap 44 which are pulled out from the cylindrical housing 12 are wrapped around the child and secured thereto to restrain the child in the shopping cart seat 19 to prevent the child from falling out from the shopping cart seat 19.

When there is no longer a need for the child to be restrained in the shopping cart seat 19, the two clasps 62 are disengaged from each other. When this occurs, the spring action of the bungee cords 58,60 urges contraction of the first strap 42 and the second strap 44 back into the cylindrical housing 12. The first strap 42 and the second strap 44 can also be elastic, and natural elasticity in the first strap 42 and the second strap 44 also pulls the first strap 42 and the second strap 44 back into the cylindrical housing 12.

The components of the shopping cart mounted child restraint apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved shopping cart mounted child restraint apparatus that is low in cost, relatively simple in design and operation, and which may advantageously be used to prevent the seat belts from becoming twisted or tangled when not in use. With the invention, a shopping cart mounted child restraint apparatus provides a handle of a shopping cart that also serves an additional function of storing seat belts that are not in use so they do not get twisted and tangled. With the invention, a shopping cart mounted child restraint apparatus provides for unused seat belts to be automatically placed in a stored condition so that they are automatically prevented from being twisted or tangled. With the invention, a shopping cart mounted child restraint apparatus is provided which enables a handle of a shopping cart to serve as a storage device for seat belts when the seat belts are not in use. With the invention, a shopping cart mounted child restraint apparatus is provided which enables a conventional shopping cart to be retrofitted for a handle that includes seat belt storage.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A shopping cart mounted child restraint apparatus, comprising in combination:
    a shopping cart having first and second handle support brackets,
    a handle adapted to be supported by said first and second handle brackets,
    said handle defining a housing, said housing including passageway channel means,
    an extendible and retractable safety restraint strap assembly housed within said housing, wherein distal portions of straps of said safety restraint strap assembly pass through said strap passageway channel means, and
    housing-to-shopping-cart connector means connected to said housing for connecting said housing to the shopping cart first and second handle support brackets.

2. The apparatus of claim 1 wherein said strap passageway channel means include:
    a first strap passageway housing channel located at said first housing end, and
    a second strap passageway housing channel located at said second housing end.

3. The apparatus of claim 1 wherein:
    said housing is a cylindrical housing which includes a first housing end and a second housing end, and
    said housing-to-shopping-cart connector means include first housing-to-shopping-cart connector means connected to said first housing end and second housing-to-shopping-cart connector means connected to said second housing end.

4. The apparatus of claim 1 wherein said safety restraint strap assembly includes:
    a strap/guide assembly, and
    housing-to-strap/guide-assembly connector means, connected to said a strap/guide assembly, for connecting said a strap/guide assembly to said housing.

5. The apparatus of claim 3 wherein:
    said first housing-to-shopping-cart connector means further include a first fastener received in said first fastener reception channel, and
    said second housing-to-shopping-cart connector means further include a second fastener received in said second fastener reception channel.

6. The apparatus of claim 4 wherein said a strap/guide assembly includes:
    a first strap,
    a first exit guide roller connected to said housing,
    a first direction reversal roller connected to said housing,
    a second strap,
    a second exit guide roller connected to said housing, and
    a second direction reversal roller connected to said housing.

7. The apparatus of claim 5 wherein:
    said first housing-to-shopping-cart connector means include a first housing end reception cap, and
    said second housing-to-shopping-cart connector means include a second housing end reception cap.

8. The apparatus of claim 6 wherein said housing-to-strap/guide-assembly connector means include:
    a first housing-to-strap connector connected between said cylindrical housing and said first strap, and
    a second housing-to-strap connector connected between said cylindrical housing and said second strap.

9. The apparatus of claim 7 wherein:
    said first housing end reception cap includes a first housing end reception sleeve portion and a first cap end portion connected to said first housing end reception sleeve portion, wherein said first housing end reception sleeve portion receives said first housing end, and wherein said first cap end portion includes a first fastener reception channel, and said second housing end reception cap includes a second housing end reception sleeve portion and a second cap end portion connected to said second housing end reception sleeve portion, wherein said second housing end reception sleeve portion receives said second housing end, and wherein said second cap end portion includes a second fastener reception channel.

10. The apparatus of claim 8 wherein said housing-to-strap/guide-assembly connector means further include:

a first spring unit connected between said first housing-to-strap connector and said first strap, and a second spring unit connected between said second housing-to-strap connector and said second strap.

11. The apparatus of claim 8 wherein said first strap and said second strap are elastic.

12. The apparatus of claim 9 wherein said strap passageway channel means further include:

a first cap strap passageway in said first housing end reception sleeve portion, and a second cap strap passageway in said second housing end reception sleeve portion.

13. The apparatus of claim 10 wherein said first spring unit and said second spring unit include bungee cords.

14. The apparatus of claim 12 wherein:

said first cap strap passageway is in registration with said first strap passageway housing channel, and said second cap strap passageway is in registration with said second strap passageway housing channel.

15. The apparatus of claim 11 wherein each of said first strap and said second strap further include clasps attached to respective free ends of said respective straps.

\* \* \* \* \*